3,275,649
PROCESS FOR THE PREPARATION OF 1-(2-HYDROXYETHYL) IMIDAZOLE DERIVATIVES
Ctirad Podesva and Kitty Vagi, Montreal, Quebec, Canada, assignors to Rhone-Poulenc S.A., a corporation of France
No Drawing. Filed Dec. 16, 1963, Ser. No. 330,547
Claims priority, application Canada, Dec. 20, 1962, 865,113
6 Claims. (Cl. 260—309)

This invention relates to a process for the preparation of imidazole derivatives.

It is the object of the present invention to provide a new and improved process for the preparation of 1-(2-hydroxyethyl)-5-nitroimidazoles of the general formula:

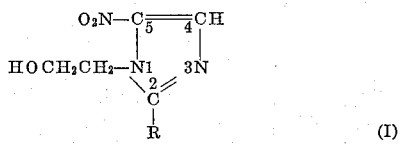

(I)

wherein R represents a hydrogen atom, or an alkyl group containing up to five carbon atoms, or an aryl (preferably phenyl), aralkyl (preferably benzyl), or alicyclic group. Compounds of this type, for example 1-(2-hydroxyethyl)-2-methyl-5-nitroimidazole, have been shown to possess valuable chemotherapeutic properties. They have a very low toxicity and are especially useful for treatment of infections caused by pathogenic protozoa such as certain species of amoebae (for example *Endamoeba histolytica*) and trichomonas (for example *Trichomonas vaginalis*).

These compounds have hitherto been prepared by reacting in the absence of a basic condensing agent a corresponding nitroimidazole compounds (unsubstituted on a ring-nitrogen atom) with a compound of the formula Z—$CH_2CH_2OY$ (wherein Z represents the acid residue of a reactive ester, such as a halogen atom or a sulphuric or sulphonic ester residue, and Y represents a hydrogen atom or a radical which is readily replaceable by a hydrogen atom, for example a benzyl group) followed, when Y is other than a hydrogen atom, by liberation of the hydroxyl group, for example by acid hydrolysis when Y is a benzyl group. Examples of appropriate starting materials Z—$CH_2CH_2OY$ are ethylene chlorohydrin and benzyloxyethyl toluene-p-sulphonate. This hitherto known process necessitates heating the reactants together, sometimes for a considerable length of time, and generally results in relatively small yields of the desired nitroimidazole.

It has now unexpectedly been found after research and experimentation that the aforesaid 1-(2-hydroxyethyl)-5-nitroimidazoles can be prepared readily and in high yields, for example in excess of 60% of theory based upon the nitroimidazole consumed, from corresponding N-unsubstituted nitroimidazole compounds and without the necessity of applying external heat to the reaction mixture by replacing the reactive ester reactant Z—$CH_2CH_2OY$ (Z and Y being as hereinbefore defined) by ethylene oxide and by carrying out the reaction in an organic acid solvent medium.

According to the present invention, therefore, there is provided a new and improved process for the preparation of 1-(2-hydroxyethyl)-5-nitroimidazoles of Formula I which comprises reacting ethylene oxide with a nitroimidazole of the formula:

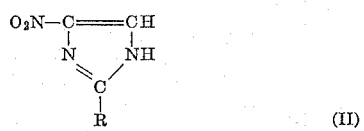

(II)

(wherein R is as hereinbefore defined) in solution in a liquid medium containing or consisting of at least one organic acid which is a solvent for the nitroimidazole starting material, and recovering the 1-(2-hydroxyethyl)-5-nitroimidazole product from the reaction mixture.

The preferred organic acid solvents are aliphatic carboxylic acids, e.g. saturated aliphatic carboxylic acids containing up to four carbon atoms; in particular formic acid. Mixtures of organic acid solvents, such as formic acid with acetic acid, may be employed. The liquid reaction medium may consist solely of the organic acid or acids, or of the acid or acids diluted with water or another acceptable diluent, for example methanol. The amount of organic acid or mixture of acids present in the reaction mixture should be such as to ensure complete solution of the nitroimidazole starting material at room temperature, which means, in practice, that it or they is or are present in excess of the molecular equivalent (preferably several times the molecular equivalent) of the nitroimidazole employed.

The best results qua yield are obtained using more than one molecular equivalent of ethylene oxide (preferably three to five molecular equivalents) per mole of nitroimidazole reactant.

The reaction is preferably carried out at room temperature, viz. within the range of 20 to 30° C., but temperatures lower or higher than room temperature, for example 10 to 40° C., may be used. Temperatures lower than 10° C. reduce the speed of the reaction and at temperatures higher than 40° C. considerable amounts of ethylene oxide may be lost by evaporation, thus unfavourably influencing the economy of the process.

According to a preferred feature of the invention, the process is carried out by introducing ethylene oxide (in the form of gas, liquid or a solution in, for example, methanol) into a solution of the nitroimidazole starting material in the selected organic acid and allowing the reaction to take place at ambient temperature.

The desired reaction product is isolated from the reaction mixture by known methods, for example by distilling off the solvent and crystallising the residue. It may be converted into an acid addition salt by methods known per se.

An important practical advantage of the process of the invention is that unchanged nitroimidazole starting material can be recovered easily in a state of high purity and suitable for use in a subsequent batch without further purification.

For therapeutic purposes, the 1-(2-hydroxyethyl)-5-nitroimidazoles of Formula I are preferably employed as such or in the form of acid addition salts containing anions which are relatively innocuous to the animal organism in therapeutic doses of the salts (such as hydrochlorides and other hydrohalides, phosphates, nitrates, sulphates, maleates, fumarates, citrates, tartrates, methanesulphonates and ethanedisulphonates) so that the beneficial physiological properties inherent in the bases are not vitiated by side-effects ascribable to the anions.

The process of the present invention is especially suited to the preparation of 1-(2-hydroxyethyl)-2-methyl-5-nitroimidazole, a compound of outstanding utility, from 2-methyl-4(or 5)-nitroimidazole.

The following examples illustrate the invention.

Example I

Ethylene oxide (2.3 g.) was introduced slowly into a solution of 2-methyl-4(or 5)-nitroimidazole (1.27 g.) in 98% formic acid (10 ml.) while keeping the temperature below 35° C. The solution was then left standing at room temperature for 30 minutes. The solvent was removed by distillation in vacuo and the residue treated with water (2 to 3 ml.). The unchanged nitroimidazole material remained undissolved and was recovered practically pure (0.33 g.) by filtration. The filtrate was made alkaline by treatment with an aqueous solution of sodium hydroxide and the crystalline 1-(2-hydroxyethyl)-2-methyl-5-nitroimidazole was collected by filtration. The yield of dry product was 0.83 g., M.P. 148° C. Extraction of the filtrate with chloroform and removal of the solvent in vacuo gave another 0.20 g. of the product. One recrystallisation from an ethyl acetate-methanol mixture raised the melting point to 160° C. The yield was 82% based on unrecovered starting material.

*Example II*

Ethylene oxide (11 g.) was introduced slowly into a solution of 2-methyl-4(or 5)-nitroimidazole (6.35 g.) in 85% formic acid (50 ml.). The temperature was maintained at 25–30° C. After the addition was complete, the reaction mixture was allowed to stand for 75 more minutes at room temperature. Working up of the reaction mixture as in Example I gave 2.6 g. of practically pure nitroimidazole starting material, and 5.06 g. of crude 1-(2-hydroxyethyl)-2-methyl-5-nitroimidazole, M.P. 152° C. The product melted at 160° C. after one recrystallization from an ethyl acetate-methanol mixture. The yield was 100% based on unrecovered starting material.

*Example III*

Ethylene oxide (11 g.) was introduced slowly into a solution of 2-methyl-4(or 5)-nitroimidazole (6.35 g.) in 65% formic acid (60 ml.). After standing for one hour at room temperature, the reaction mixture was worked up as in Example I. There were recovered 3.1 g. of practically pure nitroimidazole starting material, and 4.35 g. of 1-(2-hydroxyethyl)-2-methyl-5-nitroimidazole, M.P. 150–152° C., which after one recrystallization from methanol-ethyl acetate melted at 161° C. The yield was 99% based on unrecovered starting material.

*Example IV*

Ethylene oxide (11 g.) was introduced slowly into a solution of 2-methyl-4(or 5)-nitroimidazole (6.35 g.) in a 1:1 mixture of formic and acetic acids (50 ml.). After standing at room temperature for 2½ hours, the reaction mixture was worked up as in Example I. There were recovered 0.52 g. of practically pure nitroimidazole starting material and 6.29 g. of 1-(2-hydroxyethyl)-2-methyl-5-nitroimidazole, M.P. 153–5° C., which after one recrystallization from methanol-ethyl acetate melted at 161° C. The yield was 60.1% based on unrecovered starting material.

*Example V*

A solution of ethylene oxide (10.5 g.) in methanol (15 ml.) was added in portions to a solution of 2-methyl-4(or 5)-nitroimidazole (6.35 g.) in 98% formic acid (35 ml.). After standing for 1½ hours at room temperature, the reaction mixture was worked up as in Example I. There were recovered 2.13 g. of practically pure nitroimidazole starting material and 3.79 g. of 1-(2-hydroxyethyl)-2-methyl-5-nitroimidazole, M.P. 152–153° C., which after one recrystallisation from methanol-ethyl acetate melted at 161° C. The yield was 65.5% based on the unrecovered starting material.

We claim:

1. A process for the preparation of a 1-(2-hydroxyethyl)-4-nitroimidazole of the formula:

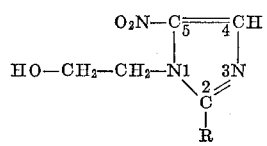

wherein R represents a member of the class consisting of hydrogen, alkyl of up to five carbon atoms, aryl, aralkyl and cycloalkyl, which consists in contacting ethylene oxide with a nitroimidazole of the formula:

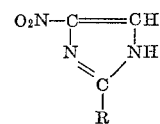

wherein R is as just defined, in solution in enough of at least one unsubstituted saturated aliphatic carboxylic acid of up to 4 carbon atoms to dissolve all the nitroimidazole starting material at the reaction temperature, and recovering the 1-(2-hydroxyethyl)-5-nitroimidazole product from the reaction mixture.

2. A process for the preparation of a 1-(2-hydroxyethyl)-5-nitroimidazole of the formula:

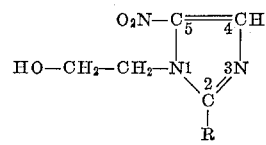

wherein R represents a member of the class consisting of hydrogen, alkyl of up to five carbon atoms, aryl, aralkyl and cycloalkyl, which consists in contacting ethylene oxide with a nitroimidazole of the formula:

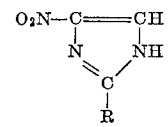

wherein R is as just defined, in solution in enough formic acid to dissolve all the nitroimidazole starting material at the reaction temperature, and recovering the 1-(2-hydroxyethyl)-5-nitroimidazole product from the reaction mixture.

3. A process according to claim 2 wherein the nitroimidazole starting material is in solution in formic acid diluted with water.

4. A process for the preparation of a 1-(2-hydroxyethyl)-5-nitroimidazole of the formula:

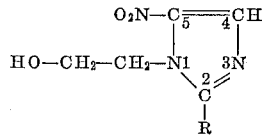

wherein R represents a member of the class consisting of hydrogen, alkyl of up to five carbon atoms, aryl, aralkyl and cycloalkyl, which consists in contacting ethylene oxide with a nitroimidazole of the formula:

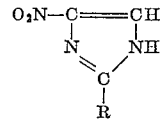

wherein R is as just defined, in solution in enough of a mixture of formic and acetic acids to dissolve all the nitroimidazole starting material at the reaction temperature, and recovering the 1 - (2 - hydroxyethyl) - 5 - nitroimidazole product from the reaction mixture.

5. A process according to claim 4 wherein the nitroimidazole starting material is in solution in a mixture of formic and acetic acids diluted with water.

6. A process for the preparation of a 1-(2-hydroxyethyl)-5-nitroimidazole of the formula:

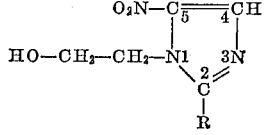

wherein R represents a member of the class consisting of hydrogen, alkyl of up to five carbon atoms, aryl, aralkyl and cycloalkyl, which consists in contacting, at a temperature between 10° and 40° C., one to five molecular proportions of ethylene oxide with one molecular proportion of a nitroimidazole of the formula:

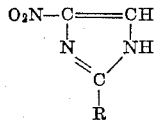

wherein R is as just defined, in solution in enough of at least one unsubstituted saturated aliphatic carboxylic acid of up to 4 carbon atoms to dissolve all the nitroimidazole starting material at the reaction temperature, and recovering the 1-(2-hydroxyethyl)-5-nitroimidazole product from the reaction mixture.

References Cited by the Examiner

UNITED STATES PATENTS 2,004,864  6/1935  Graenacher et al. ___ 260—309.2
3,010,963  11/1961  Erner _____ 260—348

OTHER REFERENCES

A Technical Bulletin on Ethylene Oxide, pages 15–17 and 21, Houston, Jefferson Chemical Company, 1956.

Winstein et al. in: Elderfield Heterocyclic Compounds, vol. 1, page 24, N.Y., Wiley, 1950.

WALTER A. MODANCE, *Primary Examiner.*

NATALIE TROUSOF, *Assistant Examiner.*

UNITED STATES PATENT OFFICE
CERTIFICATE OF CORRECTION

Patent No. 3,275,649      Dated September 27, 1966

Inventor(s) Ctirad PODESVA et al

It is certified that error appears in the above-identified patent and that said Letters Patent are hereby corrected as shown below:

In the heading of the patent, for "Rhone-Poulenc S.A., a corporation of France", read --Societe des Usines Chimiques Rhone-Poulenc, Paris, France Signed and Sealed this fifth Day of August 1975

[SEAL]

Attest:

RUTH C. MASON
Attesting Officer

C. MARSHALL DANN
Commissioner of Patents and Trademarks